Aug. 5, 1924.
H. MOCK
1,503,762
FIRELESS COOKER
Filed Nov. 17, 1922
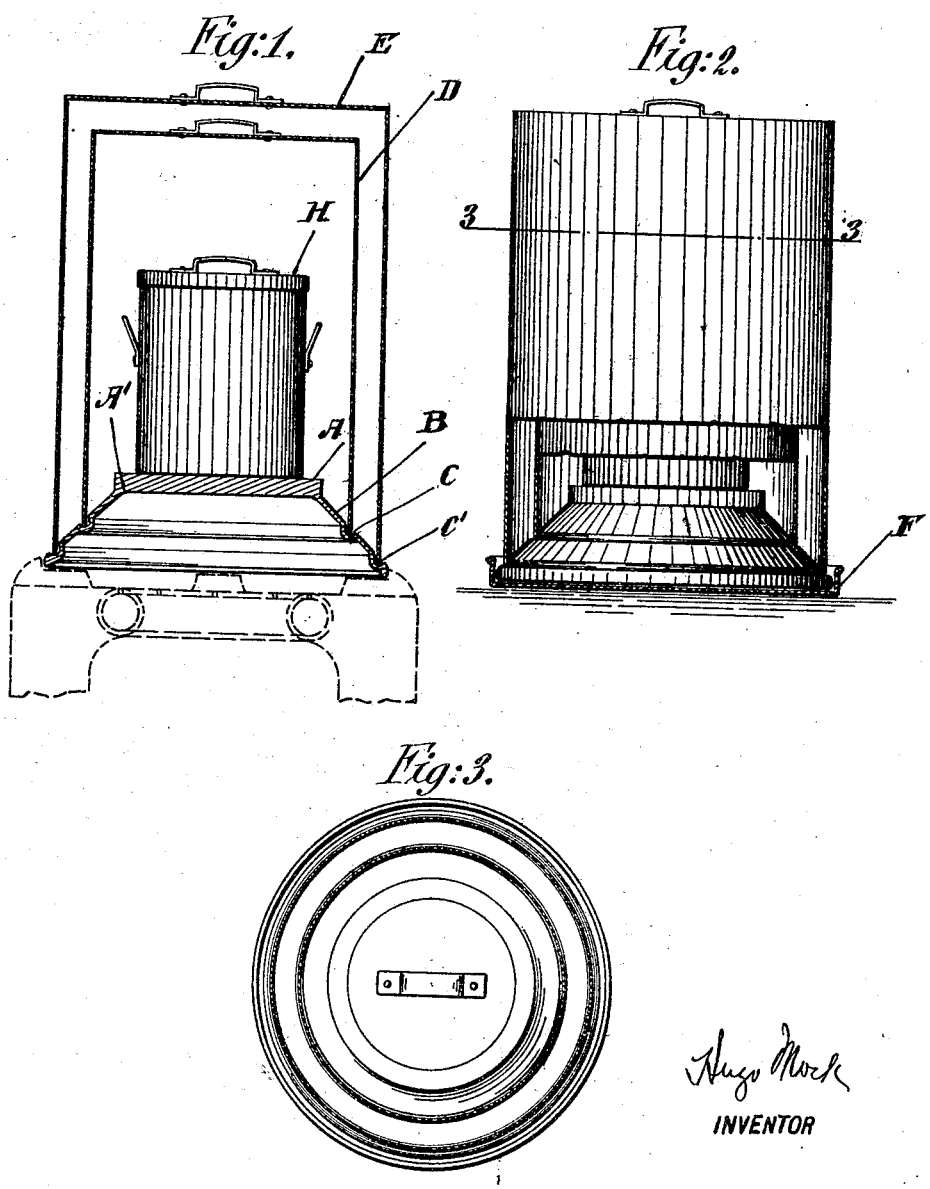

Patented Aug. 5, 1924.

1,503,762

UNITED STATES PATENT OFFICE.

HUGO MOCK, OF NEW YORK, N. Y.

FIRELESS COOKER.

Application filed November 17, 1922. Serial No. 601,465.

*To all whom it may concern:*

Be it known that I, HUGO MOCK, a citizen of the United States, residing at 930 St. Nicholas Avenue, in the city of New York, in the county of New York and State of New York, have invented certain new and useful Improvements in Fireless Cookers, of which the following is a specification.

This invention relates to fireless cookers and has for its object the provision of a fireless cooker which would be simple in construction, efficient in operation and consists of very few parts.

Further objects will be apparent from the following specification and drawing, in which Figure 1 is a vertical section of the cooker with the cooking vessel in perspective. Figure 2 is a vertical plan view of the cooker partly in section showing the cooker after the heating on gas stove or similar source of heat has been completed. Figure 3 is a horizontal section along the line 3—3 of Figure 2.

A is a cast iron base, frusto-conical in shape, having the sides b—b with grooves C and C' adapted to receive the cylindrical covers D and E. It is preferable to make the frusto-conical base A all in one piece with a plate A' of thick metal, so that same will have considerable thermal capacity. The base A acts not only as a support for the hoods D and E, but also fulfills the function of the separate heating stone in the ordinary cooker. The air-tight hoods D and E are preferably made of aluminum, whereas the base A is made of cast iron or similar metal. The shallow pan F shown in Figure 2 is a closure for the base A which is used after the cooker is removed from the gas stove.

The operation of the cooker is as follows:—

The cooking vessel is put upon the base A and the base A is put over the gas burner and heated. The heat is communicated to the base A and through the base A to the cooking vessel and after the material in the cooking vessel is boiling and the plate A' has been thoroughly heated, the gas may be turned off and the hoods D and E placed in position. If desired, the cooker may remain on the gas stove or if removed from the gas stove is preferably set into the pan or closure F. It is obvious that the plate A' after being thoroughly heated will continue to give out heat for a considerable time after the gas has been extinguished and the hoods D and E serve to thoroughly insulate the cooking vessel H from external losses of heat. In this way a cooker is provided with substantially three parts in which the bottom member acts both as a support for the cooking vessel and also as a heating stone.

What I claim and desire to secure by Letters Patent is:—

1. In a cooker, the combination of a series of insulating hoods and an insulating base on which said hoods rest, said base also serving as a heating stone.

2. In a fireless cooker, the combination of an insulating hood and an insulating base on which said hood rests, said base also serving as a heating stone.

3. In a fireless cooker, the combination of a hood, an insulating base to support said hood, said base also directly supporting the cooking vessel and serving to heat same.

4. In a fireless cooker, the combination of a series of hoods, an insulating base to support said hoods, said base directly supporting the cooking vessel and serving to heat same.

5. In a fireless cooker, an insulating top and an insulating base supporting said top and also serving as a heating stone and a groove in said base upon which said hood is seated.

6. In a fireless cooker, an insulating top and an insulating base supporting said top, said insulating base being thickened at its smallest diameter so as to serve as a heating stone.

7. In a fireless cooker, a series of insulating hoods, and an insulating base adapted to simultaneously seat said hoods and serve as a support for same, said base also serving as a heating stone.

In testimony whereof I hereunto affix my signature.

HUGO MOCK.